Nov. 15, 1960          A. R. FREDRICKSON          2,960,234
WATER SEPARATOR CARTRIDGES
Filed Sept. 5, 1958

INVENTOR.
ARTHUR R. FREDRICKSON
BY
Charles C. Willson
ATTORNEY

United States Patent Office 2,960,234
Patented Nov. 15, 1960

2,960,234

WATER SEPARATOR CARTRIDGES

Arthur R. Fredrickson, West Warwick, R.I., assignor to Fram Corporation, Providence, R.I., a corporation of Rhode Island Filed Sept. 5, 1958, Ser. No. 759,338

1 Claim. (Cl. 210—457)

This invention relates to water separator cartridges adapted to free hydrocarbon liquids of water.

The water separators now in use commonly operate in two stages. The first is the coalescer stage in which water carried by the hydrocarbon liquid is collected into droplets. The second, or separator stage, employs a separator media that will pass the hydrocarbon liquid but block the water.

The first stage commonly employs one or more coalescer cartridges in which fiber glass is the coalescer media. The second, or separator stage, usually employs one or more cartridges in which porous paper that will block the water but pass the hydrocarbon is used.

The present invention relates to improvements in the second stage cartridges whereby a simple and inexpensive type of cartridge having high separating capacity is provided.

It has been proposed heretofore to provide a pervious cylindrical wall which is covered with a porous separator media that will pass the hydrocarbon liquid but block the water particles. In such a construction the surface area of the separator media is comparatively small for the space the cartridge occupies in a separator housing or shell.

To increase the surface area of such separator media it has been proposed heretofore to provide the media with numerous pleats or folds to thereby increase the area of the paper that can be provided in the available space. It is found, however, that such pleats tend to collapse one against the other under the operating pressure of the liquid and that water will lodge between closely disposed pleats under capillary action. In each case, the water retained between the pleats will cover the pores of the paper and prevent the passage of the hydrocarbon liquid through such pores. The effect of this may be to block off as much as one-half of the entire area of the separator surface.

Having in mind the foregoing, the present invention contemplates a simple and inexpensive separator construction whereby the disadvantages resulting from the use of a pleated separator media are avoided and, at the same time, the surface area of a cylindrical type of separator media is substantially increased. These results are secured by providing the media throughout with shallow puckers that will increase the surface area of the separator media without forming pleats or folds that will retain the water.

In carrying out the present invention the separator media that will pass one liquid but block the other is formed of porous paper that should be constructed carefully so that its formation and pore size are highly uniform. This sheet is then puckered to increase the amount of paper in any given area. The depth and shape of the puckers are important. They should be rounded at the bottom of each depression and shallow so that water will not be held in these depressions by capillary action. It is possible to pucker the paper enough to approximately double its filtering area and still have the puckers so shaped that they will not retain water but will permit the water to be removed from the depressions by the movement of the liquid being separated. The rate at which the hydrocarbon liquid will pass through the separator sheet will depend upon its total surface area, and if by puckering the sheet the area of the paper used to cover a perforated cylinder is approximately doubled, then the flow of the hydrocarbon through the separator sheet will be increased correspondingly without increasing the size of the separator cartridge.

As a result of the present invention a cylindrical separator cartridge constructed in accordance with the present invention may be provided that will have about the same hydrocarbon flow rate as a pleated cylindrical type of separator cartridge having the same outside diameter. The puckered construction of the present invention has the advantage that it is easier and cheaper to make and is less likely to be damaged in shipment or use than the pleated separator cartridges now in extensive use; also water will not accumulate on its surface to a sufficient degree to seal off its pores.

The above and other features of the present invention will be further understood from the following description when read in connection with the accompanying drawing, wherein.

Figure 1:
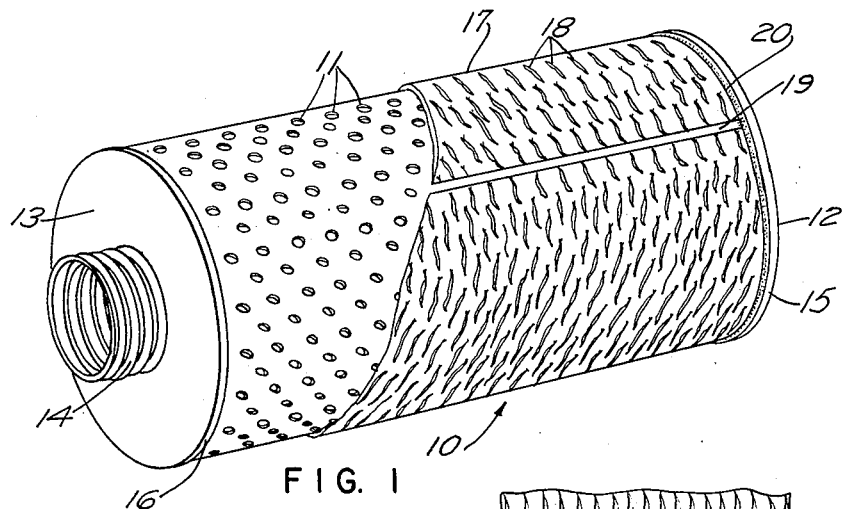
Fig. 1 is a perspective view of a separator cartridge constructed in accordance with the present invention.

Referring to the drawing, there is shown in Fig. 1 a liquid separator cartridge 10 embodying the present invention and comprising a pervious cylindrical wall 11 conveniently formed of perforated sheet metal. This cylinder wall is closed at one end by an end wall 12 and at the other end by an end wall 13. The wall 13 has a projecting threaded sleeve 14 adapted to be screwed into a threaded hole in a wall or partition. The wall 12 is shown as secured to the cylindrical wall 11 by a rolled seam 15, and the wall 13 is secured to the wall 11 by a rolled seam 16. The cylindrical wall 11 and end walls 12 and 13 may be variously formed, as the primary purpose of the wall 11 is to provide an internal support for a paper separator sheet 17. This paper sheet 17 should be carefully constructed so that it will be uniform throughout as to formation and porosity.

The paper sheet 17, in accordance with the present invention, is puckered throughout as indicated by 18. The purpose of such puckers is to contract the paper in the direction of its width or length, or both width and length, to thereby increase the surface area of the paper used to encircle and embrace the perforated cylinder 11. The puckered sheet 17 is placed around the cylinder 11 like a sleeve as shown in Fig. 1 so that its opposite edges lie close to each other and form a longitudinal seam which is sealed by cement as at 19. The ends of the cylindrical sheet 17 are secured to the underlying wall 11 by the cement 20 so that the hydrocarbon liquid must pass through the paper 17 to reach the interior of the cylinder 11.

The size and shape of the puckers 18 are important, as they should be shallow and have rounded bottoms, so that water will not be retained therein by capillary action. It is possible to pucker the paper so that water will not be held in the puckers and still approximately double the amount of paper in a given area. That is, if the cylinder 11 should be covered by a non-puckered sheet of separator paper, the total area of such paper would amount to a certain number of square inches, but by puckering the paper as shown, as much as approximately twice the number of square inches of paper can be used. This will increase substantially the separating area through which the hydrocarbon liquid is to pass and correspondingly increase the capacity of the separator cartridge over the performance of the same cylinder covered by a non-puckered separator paper. The porous paper 17 should be treated with phenol formaldehyde, or otherwise, to render it water repellent.

The paper 17 should, as above stated, be highly uniform throughout as to its formation, porosity and pore size so that the hydrocarbon liquid may pass rapidly therethrough while the entrained water is blocked. Such a sheet of paper may be puckered as shown in the drawing by various means. It is puckered while in a thoroughly damp condition and may be puckered while the paper is still damp from the paper-forming operation, or may be dampened after its formation is completed. The paper should be treated to impart stiffness thereto and to render it water repellent. These properties may be imparted to the paper by treating it with phenol formaldehyde containing a small amount of silicone, or it may be otherwise treated.

Figure 2:
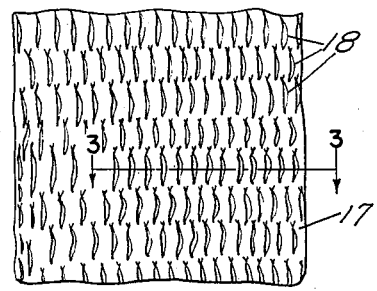
Fig. 2 is a face view of a piece of puckered separator paper such as used upon the cartridge of Fig. 1.

The paper shown in Fig. 2 has the puckers extending in parallel rows and each pucker is much longer than it is wide. These puckers can be formed by passing the damp paper sheet between a pair of cooperating rolls, one of which is formed of steel and the other of rubber. The steel roll is preferably formed of a number of gears all having the same diameter and the same number of teeth, but the teeth of one gear are slightly out of alignment in the roll as to the teeth of the next gear. As the damp paper is passed between these rolls the gear teeth will distort the paper and force it against the yielding rubber roll to form the desired puckers. In this case the paper will be condensed in the direction of its travel between the rolls, and it will enter the nip of the rolls at one speed and leave the rolls at a slower speed, corresponding to the amount the paper is condensed. The paper, after it is puckered as just described, is heated to cure the resin therein and cause it to retain the puckers.

Figure 4:
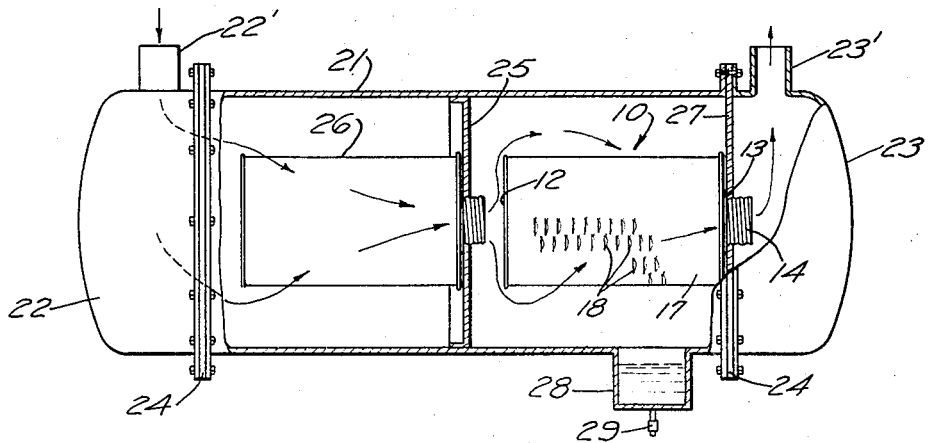
Fig. 4 is a longitudinal sectional view through a two-stage liquid separator provided with the separator cartridge of Fig. 1.

There is shown in Fig. 4 one form of liquid separator using the separator cartridge 10 of Fig. 1. Such liquid separator is shown as having only one coalescer cartridge and one separator cartridge, but more cartridges may be used if desired. Furthermore, since the performance of the separator cartridge is improved substantially by the construction of the present invention, it may be desirable to employ a longer coalescer cartridge than separator cartridge to obtain the maximum performance of each in the liquid separator.

The liquid separator shown has a horizontally extending cylindrical shell 21 and secured to one end thereof is an inlet head 22 having the inlet pipe 22', and to the other end thereof is secured an outlet head 23 having the outlet pipe 23'. Each head has a flanged portion that is bolted to a flange of the shell as at 24. Within the shell 21 there is provided about midway between its ends an upright wall or partition 25 which divides the shell into two compartments. In the first compartment is mounted a coalescer cartridge 26 which may be constructed as disclosed in the Robinson U.S. Patent 2,701,062. In the second compartment is mounted the secondary or separator cartridge 10 of Fig. 1. The flow through each cartridge is outside-in, as indicated by the arrows.

The outlet head 23 has welded thereto an upright wall 27 which is provided with a threaded hole adapted to receive the threaded sleeve 14 of the cartridge 10. This cartridge can be serviced by removing the head 23 with its attached wall 27. The cartridge 26 is serviced by removing the inlet head 22. Water separated out of the hydrocarbon stream will collect in the well 28 to be removed therefrom through the pipe 29.

Figure 3:
Fig. 3 is a sectional view taken on the line 3—3 of Fig. 2.

The puckered paper 17 may be placed about the cylinder 11 so that the puckers extend in a circumferential direction as shown, or they may extend longitudinally of the cartridge if desired. In either case the puckers should be relatively shallow and have rounded bottoms as shown in Fig. 3 so that water will not be retained therein by capillary action. If the puckers are made shallow they will drain well if the cylindrical cartridge is mounted in an upright position, and if mounted in a horizontal position as shown the flow of the hydrocarbon liquid in the separator shell will serve to wipe water from the puckers at the upper portion of the cartridge where the water will not run off readily by the action of gravity.

It will be seen from the foregoing that the present separator media is used in the form of a cylindrical shell that surrounds a perforated cylindrical support, and that by puckering the separator sheet the amount of porous paper that surrounds the cylindrical support can be largely increased and a corresponding increase in the flow of a hydrocarbon liquid therethrough obtained. The increase in porous separator paper secured by puckering the same over that of a non-puckered sheet may run anywhere from about 25% to 100% without producing puckers that will trap water therein as the separator operates. The effect of this is to double the rate at which the hydrocarbon liquid will pass through the cartridge 10 over the rate at which such liquid would pass through the same cartridge if formed of non-puckered paper.

Having thus described my invention, what I claim and desire to protect by Letters Patent is:

A separator cartridge of the outside-in-flow type for freeing a hydrocarbon liquid from water carried thereby, comprising a pervious cylindrical wall capable of withstanding the flow pressure against its outer surface, a single porous sheet of water repellent separator paper encircling and embracing said cylindrical wall in the form of a single thickness close fitting sleeve sealed along its adjacent longitudinal edges and at each end, said sheet being provied throughout with numerous depressed short shallow puckers at the outer face of the sleeve where they are exposed to the movement of the liquid being separated, said puckers having rounded bottoms and formed to increase substantially the surface area of the sleeve through which the hydrocarbon liquid can pass while the paper sleeve blocks the carried water, and the depressed puckers being exposed and shaped so that they will not retain water by capillary action while they are subjected to the wiping action of the movement of the liquid.

References Cited in the file of this patent
UNITED STATES PATENTS

| | | |
|---|---|---|
| 1,547,246 | Weaver | July 28, 1925 |
| 2,592,104 | Arakelian | Apr. 8, 1952 |
| 2,626,709 | Krieble | Jan. 27, 1953 |
| 2,748,948 | Fricke et al. | June 5, 1956 |
| 2,801,009 | Bowers | July 30, 1957 |